(12) United States Patent
Cameron

(10) Patent No.: US 9,057,638 B2
(45) Date of Patent: Jun. 16, 2015

(54) SYSTEM AND METHOD FOR DETERMINING THE LEVEL OF A SUBSTANCE IN A CONTAINER BASED ON MEASUREMENT OF RESONANCE FROM AN ACOUSTIC CIRCUIT THAT INCLUDES UNFILLED SPACE WITHIN THE CONTAINER THAT CHANGES SIZE AS SUBSTANCE IS ADDED OR REMOVED FROM THE CONTAINER

(71) Applicant: Robert H. Cameron, El Paso, TX (US)

(72) Inventor: Robert H. Cameron, El Paso, TX (US)

( * ) Notice: Subject to any disclaimer, the term of this patent is extended or adjusted under 35 U.S.C. 154(b) by 12 days.

(21) Appl. No.: 13/673,555

(22) Filed: Nov. 9, 2012

(65) Prior Publication Data

US 2014/0130594 A1 May 15, 2014

(51) Int. Cl.
*G01F 23/28* (2006.01)
*G01F 23/296* (2006.01)

(52) U.S. Cl.
CPC .................................. *G01F 23/2966* (2013.01)

(58) Field of Classification Search
CPC .................................................... G01F 23/2966
USPC ................................................ 73/149, 290 V
See application file for complete search history.

(56) References Cited

U.S. PATENT DOCUMENTS

| | | | |
|---|---|---|---|
| 3,324,716 A * | 6/1967 | Roberts | 73/149 |
| 3,540,275 A | 11/1970 | Post et al. | |
| 4,599,892 A | 7/1986 | Doshi | |
| 4,704,902 A | 11/1987 | Doshi | |
| 4,729,245 A | 3/1988 | Hansman, Jr. | |
| 4,811,595 A * | 3/1989 | Marciniak et al. | 73/149 |
| 5,226,320 A | 7/1993 | Dages et al. | |
| 5,251,482 A * | 10/1993 | Bates et al. | 73/290 V |
| 5,319,973 A | 6/1994 | Crayton et al. | |
| 5,349,852 A | 9/1994 | Kamen et al. | |
| 5,533,389 A | 7/1996 | Kamen et al. | |
| 5,575,310 A | 11/1996 | Kamen et al. | |

(Continued)

FOREIGN PATENT DOCUMENTS

| | | |
|---|---|---|
| WO | WO 84/03834 A1 | 7/1986 |
| WO | WO 90/10849 A1 | 9/1990 |

OTHER PUBLICATIONS

Liu, Fei, "A Tunable Electromechanical Helmholtz Resonator", University of Florida, 2007, pp. 15-49.*

*Primary Examiner* — Hezron E Williams
*Assistant Examiner* — David Z Huang
(74) *Attorney, Agent, or Firm* — Luis M. Ortiz; Kevin Souks; Kermit D. Lopez

(57) ABSTRACT

Level of a substance in a container can be determined by exciting vapor in unfilled space within the container. Variable frequency oscillator and emitting transducer can provide signals to excite resonance of vapor. A sensor can measure the peak resonant signal of vapor excited in unfilled space within the container as the amount of substance in the container changes. A signal-processing unit coupled to the sensor and variable frequency oscillator can process signals sensed by the sensing transducer and can extract them from background noise affecting the acoustic signal of the system using correlation functions by referencing the signal generated by the variable frequency oscillator. A computer can obtain the signal processed by the signal-processing unit and calculate unfilled space within the container and derive therefrom an amount of filled space representing the amount of the substance contained therein. A gauge can indicate the amount of substance in the container.

17 Claims, 5 Drawing Sheets

(56) References Cited

U.S. PATENT DOCUMENTS

| | | | |
|---|---|---|---|
| 5,793,705 A | 8/1998 | Gazis et al. | |
| 5,856,953 A | 1/1999 | Durkee | |
| 5,895,848 A | 4/1999 | Wilson et al. | |
| 6,138,507 A | 10/2000 | Getman et al. | |
| 7,213,456 B2 | 5/2007 | Rollwage et al. | |
| 7,296,472 B2 * | 11/2007 | Cobb | 73/579 |
| 7,707,877 B2 * | 5/2010 | Nishizu et al. | 73/149 |
| 7,784,331 B2 | 8/2010 | Ellson et al. | |
| 7,856,876 B2 | 12/2010 | Bostrom | |
| 7,900,505 B2 | 3/2011 | Mutz et al. | |
| 7,905,143 B2 | 3/2011 | Lagergren | |
| 7,926,341 B2 | 4/2011 | Boudaoud et al. | |
| 7,971,956 B2 | 7/2011 | Zhang | |
| 2008/0211838 A1 | 9/2008 | Zhang | |
| 2008/0279415 A1 * | 11/2008 | Roemer et al. | 381/400 |
| 2009/0112476 A1 * | 4/2009 | Parker | 702/6 |

* cited by examiner

SYSTEM AND METHOD FOR DETERMINING THE LEVEL OF A SUBSTANCE IN A CONTAINER BASED ON MEASUREMENT OF RESONANCE FROM AN ACOUSTIC CIRCUIT THAT INCLUDES UNFILLED SPACE WITHIN THE CONTAINER THAT CHANGES SIZE AS SUBSTANCE IS ADDED OR REMOVED FROM THE CONTAINER

FIELD OF THE INVENTION

The present invention is generally related to measurement devices used to measure the level of substance (e.g., liquid or solid) within a container (e.g., a vessel, tank, room). The present invention is more particularly related to systems and methods for determining the amount of substance within a container by measuring the unfilled space using the resonance from an acoustic circuit including the empty space as a component of the acoustic circuit within the container that changes in size as the amount of the substance is added or removed from the container.

BACKGROUND OF THE INVENTION

A fuel gauge is an instrument used to indicate the level of fuel contained in a tank. Although commonly used in automobiles, similar gauges can also be used to determine the substance level for any tank including storage tanks.

When used in automobiles, the fuel gauge typically consists of two parts: the sensing unit and the indicator. The sensing unit usually uses a float connected to a potentiometer. The indicator is usually mounted in a dashboard of modern automobiles and typically includes a needle calibrated to point to a scale consisting of printed ink designed as a metered analog gauge with a needle indicating the level of fuel that remains in a tank based on where the needle is pointing to on the gauge. As the tank empties, the float drops and slides a moving contact along a resistor, increasing its resistance. In addition, when the resistance is at a certain point, it will also typically turn on a "low fuel" light on some vehicles.

There are many problems with the current state of the art for liquid level measurement. The principle problem is that the float system is not linear. When the float is horizontal it accurately measures the level of fluid in the tank. As the float becomes more vertical, it is no longer accurate. Also, irregularities in the shape and position of the tank may affect the accuracy of the system. Therefore there is a need for another safer, non-contact based method for fuel level to be determined. Modern vehicles usually have a computer that calculates "miles to empty", but the older system of electrical measurement causes wild fluctuations in the calculations; therefore a vehicle operator cannot completely rely on the accuracy of the system when planning a future stop to refuel.

Helmholtz resonance is the phenomenon of air resonance within a cavity, such as the noise that occurs when one blows across the top of an empty bottle. The air in the port or tube (also referred to as the neck of the chamber) has mass and friction with the walls of the tube. A longer tube would make for a larger mass and more friction, and vice-versa. The diameter of the tube is also related to the mass of air. The resonance of a bottle can change as liquid is added inside the bottle. The present inventor believes that Helmholtz resonance can be used to measure substance by measuring the unfilled space (unfilled with respect to a substance, but containing vapor) in a container allowing the calculation of the amount of substance filling the container, which is the primary goal of the present invention, for which details will now be further described below. Resonant signals vary in frequency and amplitude.

SUMMARY OF THE INVENTION

It is a feature of the present invention to provide a system for determining the amount of substance within a container by measuring the resonance from an acoustic circuit including unfilled space as a component of the acoustic circuit within the container that changes in size as the amount of the substance is added or removed from the container.

It is another feature of the present invention to include in the system an emitting transducer providing a signal generated by a variable frequency oscillator to excite acoustic resonance of an acoustic circuit represented by a container having an unfilled space containing vapor analogous to a capacitor of an acoustic circuit, and a tube (which can be variable in length for tuning) analogous to an inductor of an acoustic circuit, wherein the vapor experiences friction as it moves within the tube, which is analogous to a resistor of an acoustic circuit. The tube may have an opening that can be capped by a metal disc including a flexible seal connecting the outer perimeter of the cap with the mouth of an opening associated with the tube.

It is yet another feature of the present invention to provide a sensing transducer for measuring the amplitude of the signal as it changes as the circuit achieves resonance and as the container is filled or empties.

It is another feature of the present invention to provide a signal-processing unit that can be coupled to the sensing transducer and to the variable frequency oscillator that is driving the emitting transducer. The signal-processing unit can process the signal sensed by the sensing transducer to extract it from any background noise affecting the acoustic resonance system using correlation functions by referencing the signal generated by the variable frequency oscillator.

It is another feature of the present invention to provide a computer wherein the signal processed by the signal-processing unit is provided to the computer to calculate the empty space of the container and thus derive an amount of filled space representing the amount of the substance in the container.

It is another feature of the present invention to provide a gauge in communication with the computer to provide a readout or indication of how much substance is in the container and/or an estimate of when the substance will be depleted.

DRAWINGS OF THE INVENTION

FIG. 1 illustrates a block diagram of a system for measuring the level of a substance in a container.

FIG. 2 illustrates a block diagram of a system for measuring the level of substance in a container including a tube that can be varied in length to enable tuning of the acoustic circuit. Also shown is a cap that can be used to seal an opening formed at an end of said tube and can be attached to the opening with a flexible surround around the caps perimeter, because the lid should be able to freely move (like a speaker cone) as the system resonates.

DETAILED DESCRIPTION OF THE INVENTION

Figure 1:
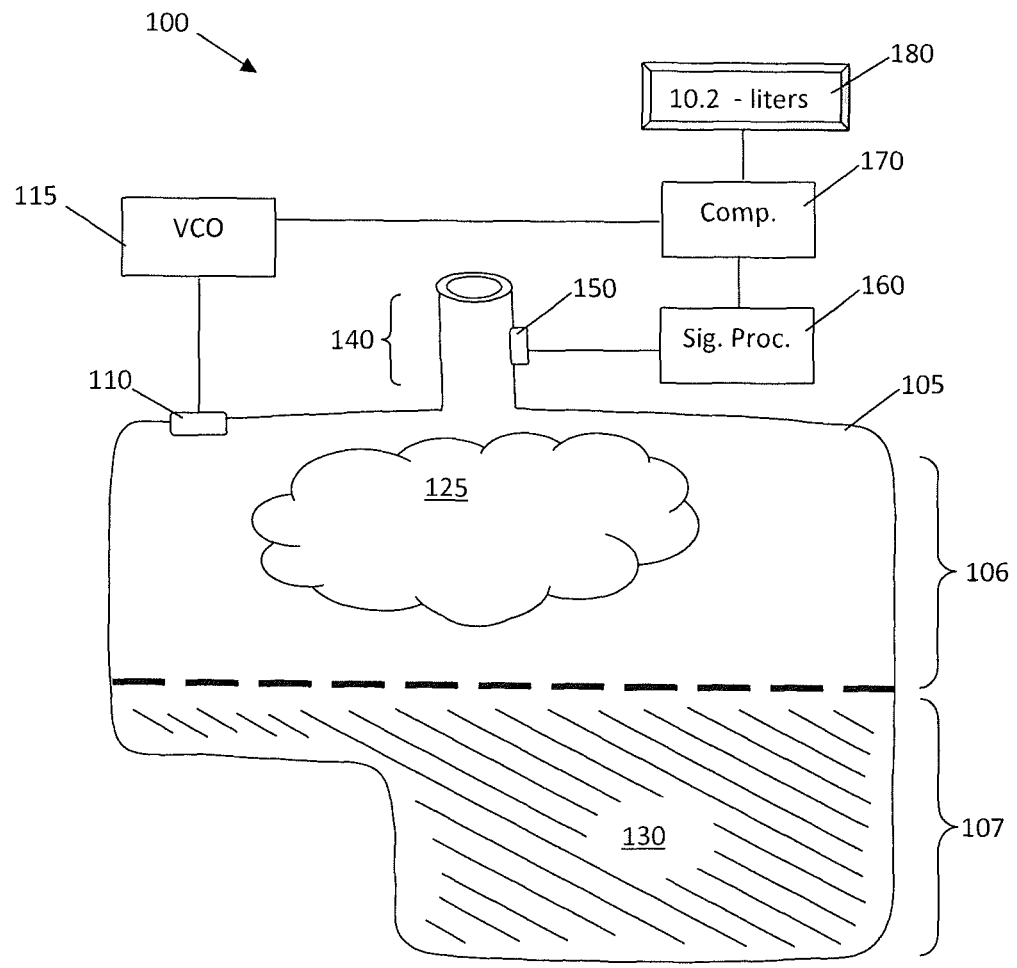

Referring to FIG. 1, a system 100 is illustrated for measuring the level of a substance in a container. The system 100 includes an emitting transducer 110 that can provide a signal generated by a variable frequency oscillator 115 in an unfilled space 106 containing vapor 125 (substance empty, vapor-filled space) located within a container 105 that is also containing a substance 130 within filled space 107. Signals from the emitting transducer 110 excite acoustic resonance of an acoustic circuit represented by a container 105, the unfilled space 106 filled with vapor 125 (analogous to a capacitor of an acoustic circuit). A tube 140, analogous to an inductor of an acoustic circuit, can be provided wherein vapor 125 (also found in the tube) experiences friction as it moves within the tube 140. The vapor 125 is analogous to a resistor of an acoustic circuit.

A sensing transducer 150 mounted on the tube 140 measures resonance (amplitude and frequency of signal) as it changes when the resonant circuit achieves resonance in the tube 140 as substance 130 is added or removed from the container 105. A signal-processing unit 160 can be coupled to the sensing transducer 150 and to the variable frequency oscillator 115 that is driving signals to the emitting transducer 110. The signal-processing unit 160 processes resonant signals sensed by the sensing transducer 150 with reference to signals generated by the variable frequency generator 115 and can extract the resonant signals from background noise using correlation functions.

A computer 170 can be provided in the system wherein signals processed by the signal-processing unit 160 are provided to the computer 170 to calculate the unfilled space 106 of the container 105 and thus derive an amount of substance 130 contained by filled space representing the amount of the substance 130 in the container 105. A gauge 180 (e.g., digital readout, analog readout, etc.) can be provided in communication with the computer 170 to provide a readout or indication of at least one of: how much substance is in the container, an estimate of when the substance will be depleted, and the rate of substance depletion (e.g., when substance is being used as a combustible in a power generating system).

Figure 2:
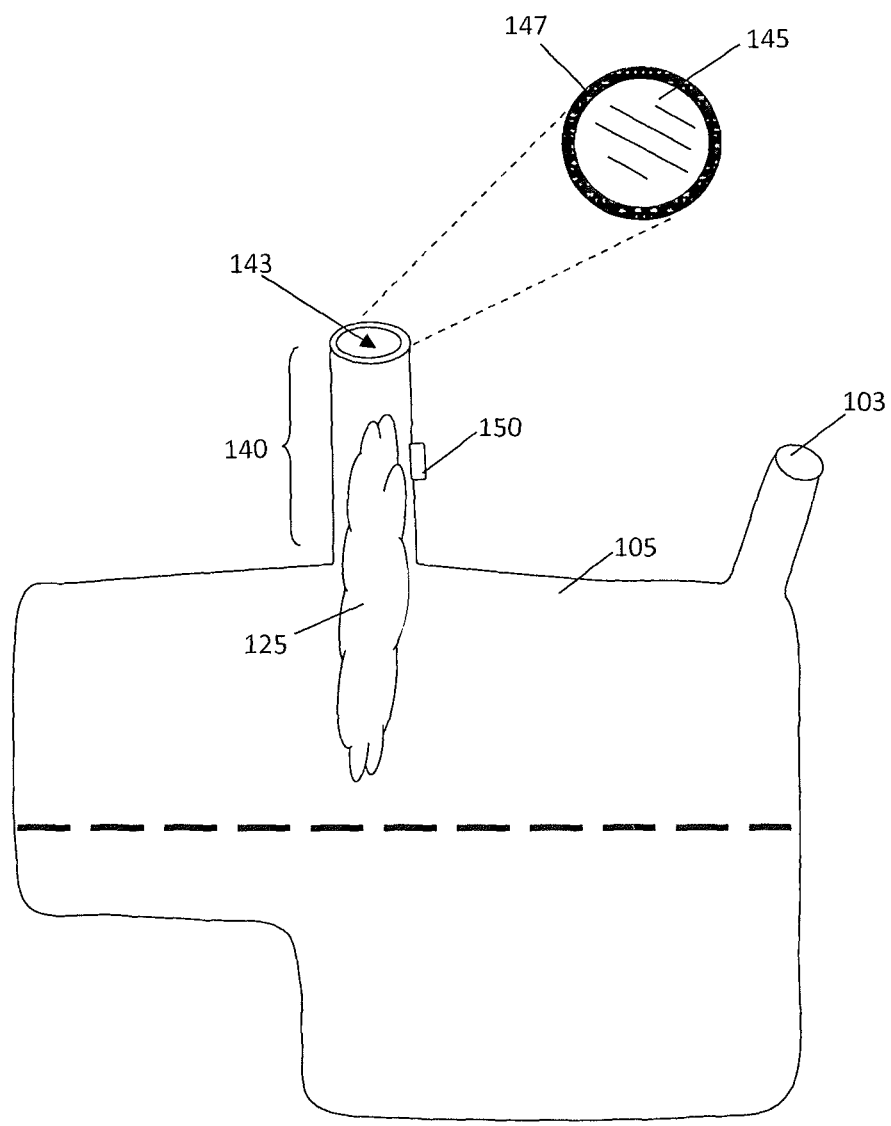

Referring to FIG. 2, the tube 140 can be varied in length to enable tuning and/or calibration of the acoustic circuit. A cap 145 can be used to seal an opening 143 formed at an end of said tube 140. The cap 145 can be attached to the opening with a flexible surround 147 around the caps perimeter, because the lid should be able to freely move (like a speaker cone) as the system resonates. The sensing transducer 150 can be mounted in the tube 140 extending from the container 105, although it may be possible to mount the sensing transducer 150 at other areas around the container 105. In some tanks, it may be necessary to include a separate fill tube 103 for use in inserting or removing substance from the tank. A separate fill tube 103 will prevent the sensing transducer 150 and tube 140 from becoming disturbed or damaged. It should be appreciated that other tubing may be used in connection with the system but do not require disclosure herein to understand the present invention. Examples of additional tubing include fuel lines as used to deliver fuel to the combustion system or engine in an automobile.

Figure 3A:
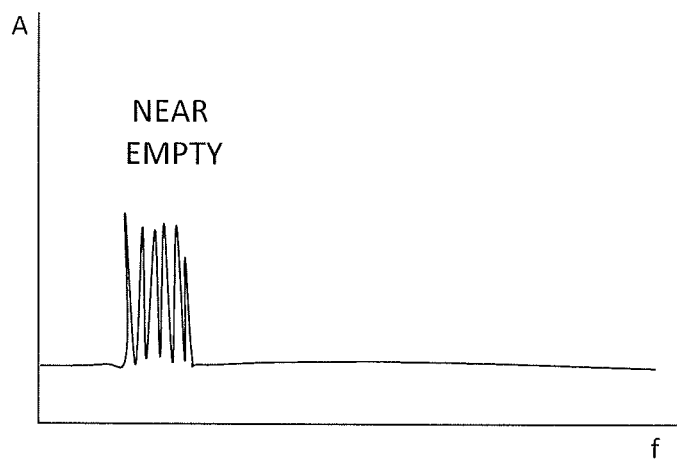
FIGS. 3A through 3C illustrate charts of resonant signals measured when a container is near empty, half empty and near full.
Figure 3B:
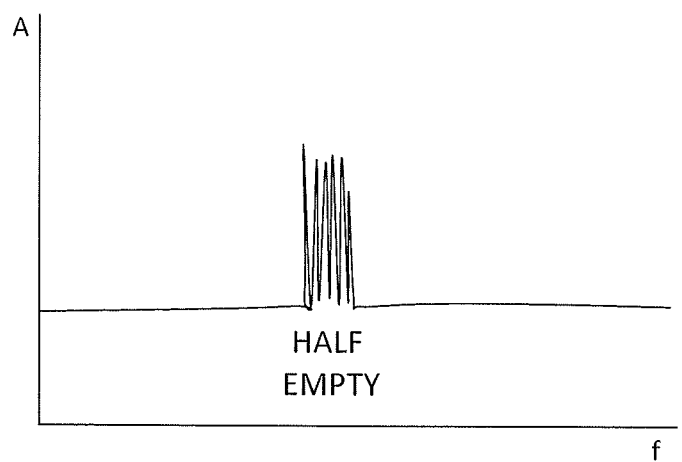
Figure 3C:
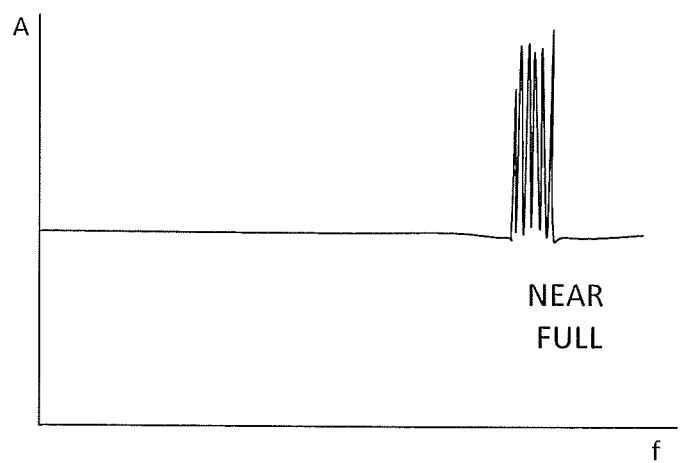

Referring to FIGS. 3A through 3C, charts of resonant signals measured when a container near empty, half empty and near full are shown.

Figure 4:
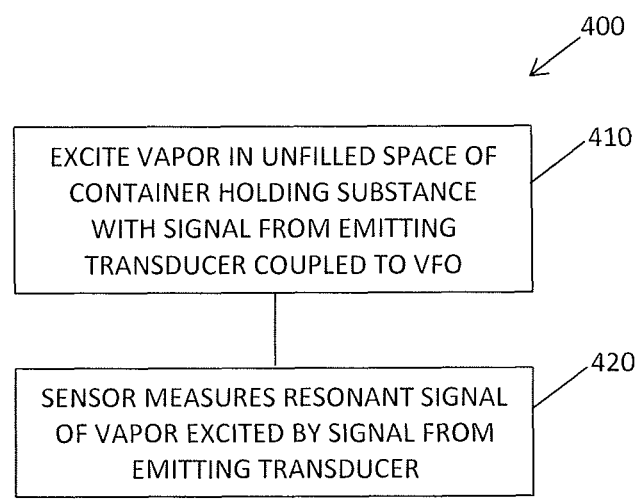
FIG. 4 illustrates a flow diagram of a method of determining the level of a substance in a container.

Referring to the flow diagram 400 in FIG. 4, a method for determining the level of a substance in a container 105 is described. As shown in Block 410, vapor in an unfilled space 106 within a container 105 holding a substance 130 is excited by a signal provided from an emitting transducer 110 coupled to a variable frequency oscillator 115 providing signals to the emitting transducer 110 that excite resonance. Then a sensor 150 is used to measure the resonant signal of the vapor 125 excited by the signal from the emitting transducer 110 as shown in Block 420. The resonant signal is a component of an acoustic circuit created by the unfilled space 106 that changes as the amount of the substance 130 is added or removed from the container 105. The sensor 150 can detect the frequency and amplitude of resonant signals created in the tube 140 and unfilled space 106 associated with the contained and extending away from the unfilled space 106. The resonant circuit created by vapor 125 in the container's unfilled space and the tube achieves resonance as substance 130 within the container 105 is added or removed from the container 105.

Figure 5:
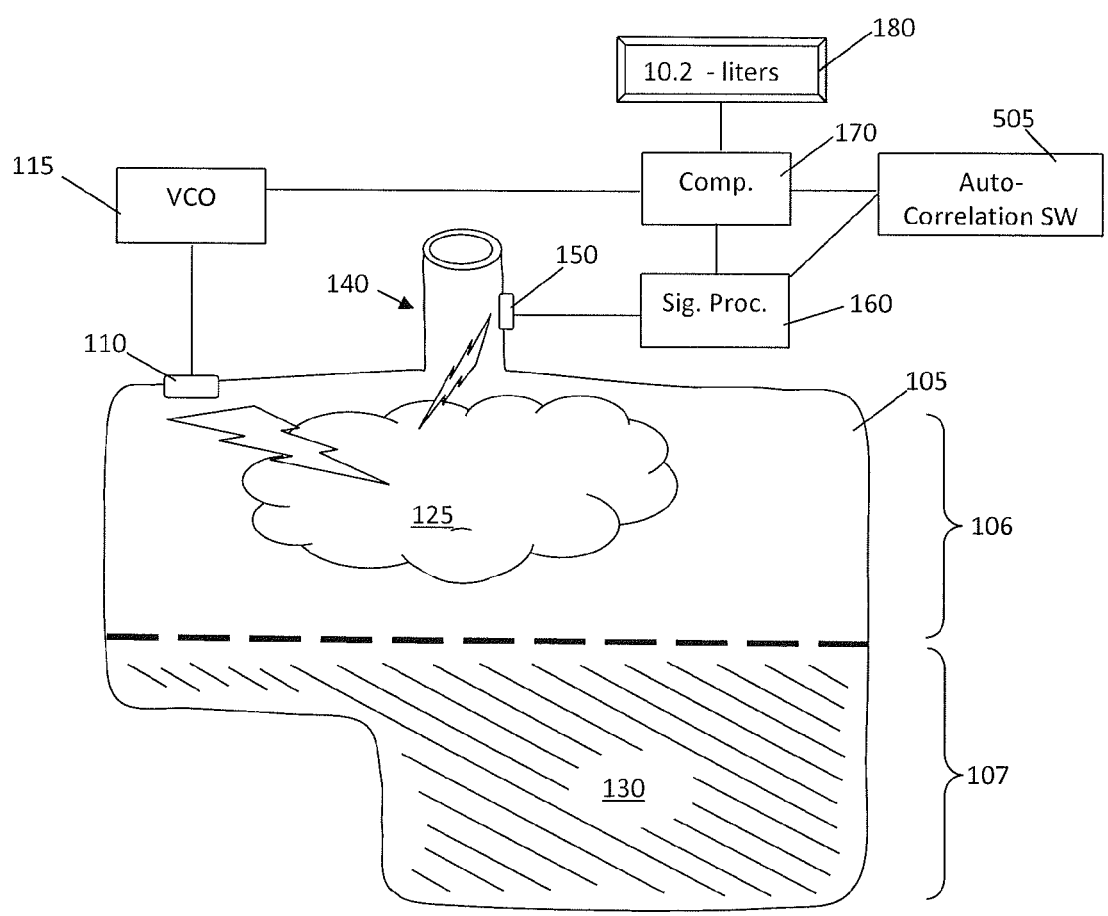
FIG. 5 illustrates the system described in FIG. 1 where correlation software can be used by a signal-processing unit and/or computer to process signals sensed by the sensing transducer and extract them from any background noise affecting the acoustic resonance system using correlation functions by referencing the signal generated by the variable frequency oscillator.

Referring to FIG. 5, the system 100 described in FIG. 1 is shown where correlation software 505 can be used by a signal-processing unit 160 and/or computer 170 to process signals sensed by the sensing transducer 150 and extract them from any background noise affecting the acoustic resonance system using correlation functions by referencing the signal generated by the variable frequency oscillator 115. A signal-processing unit 160 can be provided and coupled to the sensing transducer 150 and to the variable frequency oscillator 115 that is driving the emitting transducer 110 in order to process signals using correlation.

A computer 170 can be provided to obtain the signal processed by the signal-processing unit 160 and calculate unfilled space 106 within the container 105 and derive therefrom an amount of filled space 107 representing the amount of the substance 130 contained within the container 105.

A gauge 180 can be provided in communication with the computer 170 to provide a digital readout or analog indication of at least one of: how much substance is in the container 105, an estimate of when the substance will be depleted, and the efficiency of substance depletion.

The invention claimed is:

1. A system for measuring the level of a substance in a container, comprising:
   an emitting transducer mounted on an inner surface of a body of said container providing a signal generated by a variable frequency oscillator to excite acoustic resonance of an acoustic circuit represented by a container having an empty space filled with a vapor analogous to a capacitor of an acoustic circuit;
   a tube analogous to an inductor of an acoustic circuit, wherein the vapor experiences friction as it moves within the tube, which is analogous to a resistor of an acoustic circuit;
   a second tube configured to allow for the addition or removal of said substance in said container without perturbing said tube analogous to said inductor of an acoustic circuit;
   a sensing transducer mounted on an inner vertical surface of said tube analogous to an inductor measuring amplitude of the signal as it changes as the circuit achieves resonance and as the container is filled or emptied; a cap capping an opening formed at an end of said tube, wherein said cap includes a flexible perimeter connecting the cap to the opening formed at the end of said tube, wherein said cap is configured to move freely as said system resonates and a signal processing unit coupled to the sensing transducer and the variable frequency oscillator driving the emitting transducer, said signal processing unit processing the signal sensed by the sensing transducer to extract resonant frequencies from background noise using correlation functions by referencing the signal generated by the variable frequency oscillator.

2. The system of claim 1, further comprising a computer wherein the signal processed by the signal processing unit is provided to the computer to calculate the empty space of the container and thus derive an amount of filled space representing the amount of the substance in the container.

3. The system of claim 2, further comprising a gauge in communication with the computer to provide a readout or indication of how much substance is in the container and an estimate of when the substance will be depleted.

4. The system of claim 1, wherein said tube is variable in length to enable tuning of the acoustic circuit.

5. A system or measuring the amount of a substance in a container, comprising:

an emitting transducer mounted on an inner surface of a body of said container providing a signal generated by a variable frequency oscillator to excite acoustic resonance of an acoustic circuit represented by a container having an empty space filled with a vapor that is analogous to a capacitor of an acoustic circuit;

a tube, which is analogous to an inductor of an acoustic circuit, wherein the vapor experiences friction as it moves within the tube, which is analogous to a resistor of an acoustic circuit;

a second tube configured to allow for the addition or removal of said substance in said container without perturbing said tube analogous to said inductor of an acoustic circuit; a cap capping an opening formed at an end of said tube, wherein said cap includes a flexible perimeter connecting the cap to the opening formed at the end of said tube, wherein said cap is configured to move freely as said system resonates and a sensing transducer mounted on the tube, said sensing transducer measuring the amplitude of the signal as it changes and as the circuit achieves resonance after substance is added or removed from the container.

6. The system of claim 5, further comprising a signal-processing unit coupled to the sensing transducer and the variable frequency oscillator, wherein the signal-processing unit processes signals sensed by the sensing transducer to extract the signals from any background noise affecting the acoustic resonance system by using correlation functions and by referencing the signal generated by the variable frequency oscillator.

7. The system of claim 6, further comprising a computer coupled to the signal-processing unit, wherein the signal processed by the signal-processing unit is provided to the computer to calculate the empty space of the container and thus derive an amount of filled space representing the amount of the substance in the container.

8. The system of claim 7, further comprising a gauge in communication with the computer to provide a readout or indication of how much substance is in the container and an estimate of when the substance will be depleted.

9. The system of claim 5, wherein said tube can be variable in length for tuning inductance of the acoustic circuit represented by the system.

10. The system of claim 9, further comprising a signal-processing unit coupled to the sensing transducer and the variable frequency oscillator, wherein the signal-processing unit processes signals sensed by the sensing transducer to extract resonant frequencies from any background noise affecting the acoustic resonance system by using correlation functions and by referencing the signal generated by the variable frequency oscillator.

11. The system of claim 10, further comprising a computer coupled to the signal processing unit, wherein the signal processed by the signal-processing unit is provided to the computer to calculate the empty space of the container and thus derive an amount of filled space representing the amount of the substance in the container.

12. The system of claim 11, further comprising a gauge in communication with the computer to provide a readout or indication of how much substance is in the container and an estimate of when the substance will be depleted.

13. A method for determining the level of a substance in a container, comprising:

exciting vapor in an empty space within said container with a resonant signal provided by an emitting transducer mounted on an inner surface of a body of said container coupled to a variable frequency oscillator for providing signals to the emitting transducer that cause resonance, wherein said container is also holding a substance; and using a sensor to measure the resonant signal of the vapor excited by the resonant signal from the emitting transducer in the empty space within the container, wherein the resonant signal is a component of an acoustic circuit created by the container, vapor, and substance that changes as the amount of the substance is added or removed from the container wherein said sensor is mounted in a tube extending from the container and said tube is capped with a flexible lid connected to an opening at the end of said tube with a flexible material enabling the lid to move freely relative to said container.

14. The method of claim 13, wherein the sensor measures the amplitude of the signal as it changes and as the circuit achieves resonance as substance within the container is added or removed from the container.

15. The method of claim 14, wherein a signal-processing unit is provided and is coupled to the sensor and to the variable frequency oscillator that is driving the emitting transducer, wherein the signal-processing unit processes signals sensed by the sensing transducer and extract resonant frequencies from any background noise affecting the acoustic resonance system using correlation functions by referencing the signal generated by the variable frequency oscillator.

16. The method of claim 15, wherein a computer is provided to obtain the signal processed by the signal-processing unit and calculate empty space within the container and derive therefrom an amount of filled space representing the amount of the substance contained within the container.

17. The method of claim 16, wherein a gauge is provided in communication with the computer to provide a readout or indication of how much substance is in the container and an estimate of when the substance will be depleted.

\* \* \* \* \*